June 4, 1963
M. B. CARTER ETAL
3,092,437
PROCESS FOR MAKING CARBON ARTICLES
Filed Dec. 18, 1958
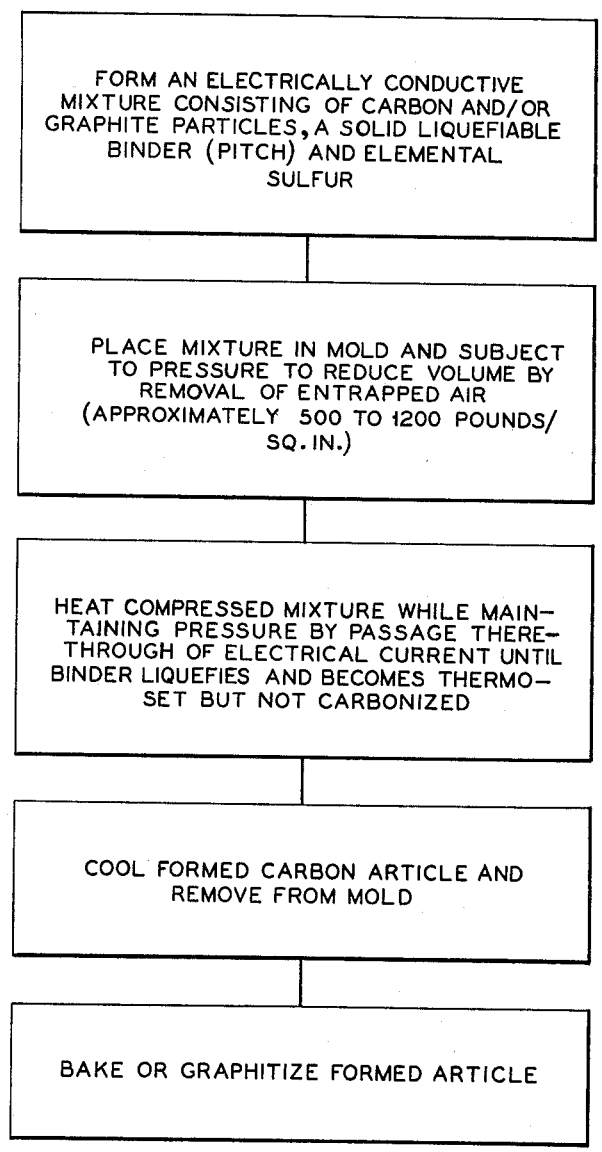
INVENTORS
MORRIS B. CARTER
ROBERT C. STROUP
JOSTEIN J. VADLA
KENNETH B. McGHEE
BY John F. Hofmann
ATTORNEY 3,092,437
PROCESS FOR MAKING CARBON ARTICLES
Morris B. Carter, Columbia, Tenn., Robert C. Stroup, Fostoria, Ohio, Jostein J. Vadla, Grand Island, N.Y., and Kenneth B. McGhee, Fostoria, Ohio, assignors to Union Carbide Corporation, a corporation of New York
Filed Dec. 18, 1958, Ser. No. 781,187
3 Claims. (Cl. 18—47.5)

This invention relates to a process for making carbon articles, wherein a thermosetting pitch-bonded mix containing sulfur is cured under mechanical pressure.

Conventionally in the manufacture of carbon articles a mixture of comminuted carbon particles and a thermoplastic binder, usually pitch, is extruded or molded to a suitable shape. The article so produced is said to be in the "green" state until it is baked to carbonize the binder. Baking of such articles is required to be at a slow rate of temperature rise to avoid damaging them. During baking, there occurs an expansion of the carbon mass on heating to temperatures up to about 450° C. On heating to higher temperatures shrinkage occurs. To minimize the effects of expansion and shrinkage, the conventional baking operation for large articles often may require as long as eight weeks, with the major portion of this period being employed for heating, and the remainder for cooling the heated articles. Baked carbon articles produced by prior art processes of this type are fluid-permeable to a high degree.

Broadly the principal object of the present invention is to provide a process for making baked carbon articles of improved properties from carbonaceous materials and sulfur.

It is an equally important object of the present invention to provide a process of the character described, which process permits a wide latitude in the selection of predetermined characteristics of starting materials.

Another important object of the invention is to provide a process of the character described, which process can produce carbon articles of desired quality in a very short time, and under relatively mild temperature and pressure conditions.

A further object of the inventtion is to provide a carbon-forming process that will permit an increase in the size range which can be treated for a given mix formulation, and will allow heretofore impractical changes in mix formulation while decreasing the permeability, increasing the strength, increasing the apparent density and increasing the thermal quality for a given size range and end use of the finished product.

These objects are attained by the process of the present invention which is illustrated by the block diagram in the single figure of the accompanying drawing.

The process in accordance with the invention employs as starting raw materials an electrically conductive mixture of comminuted carbonaceous materials and sulfur. The carbonaceous materials consist of carbon and graphitic particles, together with a binder material, such as pitch, capable of polymerizing under 400° C.

The end product of the invention is an unimpregnated, baked and graphitized carbon article, the smallest dimension of which is at least 17 inches and having an apparent density of at least about 1.80 grams per cubic centimeter, a permeability not greater than 15 to 20 millidarcys, a modulus of rupture of at least about 2000 pounds per square inch and a specific resistance less than about 2000 micro-ohm centimeters.

Following intimate blending of the raw materials, the process of the invention comprises enclosing the blend or mix in a mold, subjecting the materials in the mold to a pressure sufficient to compress the same and decrease the volume thereof by about 20 percent by the removal of air entrapped therein and to ensure substantially uniform compaction of the mix. The pressure required to be applied for the attainment of these objectives is determined by the particle size distribution and by the shape and size of the article to be produced. The finer the particles in the blend, the greater will be the pressure required. Generally at least 500 pounds per square inch will be required with a relatively coarse particle blend, and for finer materials pressures as high as about 1200 pounds per square inch will be required.

The compressed blend is now uniformly heated while it is in the mold, to a maximum temperature of 400° C. and usually at about 350° C. or until the binder material has become thermoset, but under no circumstance to a temperature so high as to carbonize the binder. Generally speaking, the range of temperature rise should be sufficiently rapid to cause solution of sulfur in the pitch binder as well as a reaction with the hydrogen thereof to form hydrogen sulfide. Uniform heating of the compacted blend is best accomplished electrically, and it is preferred that it be done by the passage of electric current therethrough.

Heating should be accomplished as rapidly as possible, but care must be taken not to heat at a rate so rapid as to entrap gaseous reaction products within the compacted blend. The rate of heating will depend upon the permeability of the compacted blend and the size and shape of the article to be produced. The rate of heating, of course, is affected by the current input to the compacted blend. As an indication of the magnitude of current used in making a cylindrical shape 40 inches in diameter, and 45 inches long current densities in the range of about 4 to 10 amperes per square inch have been used satisfactorily. Articles to be produced from the same blend composition but of lesser diameter allow the application of higher current densities.

As above indicated, heating is continued until the binder in the compacted blend is thermoset. Generally this condition is accomplished when the temperature of the blend rises to about 350° C. This end point can be determined by observation of the substantial cessation of evolution of gaseous sulfurous reaction product such as mercaptans and hydrogen sulfide.

When the binder is thermoset, the heating current is discontinued. While the material in the mold is still held between the plungers used to apply pressure during heating, full pressure is not maintained, but is allowed to decrease as the mold and contents cool. When the pressure falls below about 500 pounds per square inch, the plungers may be removed and the material in the mold, now a formed carbon shape, may be stripped from the mold.

The formed article produced by the steps just described is amenable to rapid baking in a conventional gas baking furnace used for the production of gas-baked carbon articles. It is also suitable for direct conversion to graphite by heating to graphitizing temperatures in a conventional graphitizing electric furnace. Because it is thermoset it does not become plastic upon heating to carbonizing or graphitizing temperatures, and does not undergo excessive expansion such as would ordinarily cause internal flaws such as lamination, cracking or voids.

The process of the invention not only is advantageous from the standpoint of making possible the production of articles of very large size in substantially shorter time than is possible for prior processes, but it also makes possible the utilization of raw materials of different nature than those heretofore used, leading to the production of articles of superior properties such as strength, permeability and apparent density.

More specifically, the process of the invention makes possible the utilization of very finely divided materials for the manufacture of very large articles.

Suitable materials for use in the invention are:

(a) Graphitized coke, crushed and sized through 1/32 inch, and retained on a 1/64 inch opening screen;

(b) Graphitized coke milled so that 45 percent thereof passes through an 0.005 inch opening screen (45 flour).

(c) Calcined petroleum coke crushed and sized through a 1/32 inch and retained on 1/64 inch opening screen.

(d) Calcined and milled petroleum coke 55 percent of which passes through a 200 mesh screen (55 flour).

(e) Commercial thermatomic carbon black.

The binder materials include pitch having a melting point ranging from 120° C. to 175° C., and capable of polymerizing below 400° C. To allow the binder to be thoroughly and uniformly dispersed throughout the blend, it must be crushed to powder dimensions, and sized to a fineness such that all of it will pass through a 35 mesh Tyler screen. In any event, none of the binder particles should be larger than the largest inert carbon particle in the blend. Commercial grade sulfur sized 95 percent through 325 mesh screen is preferred. The proportions of the above materials which are used in the blend are dependent on the characteristics desired in the final product. Dry ingredients used in the blend usually consist of from 50 to 100 parts by weight of graphitized coke base material with 8 to 16 parts by weight of carbon black, from 22 to 35 parts by weight of pitch binder and 6 to 25 percent by weight of the pitch, of sulfur. The graphitized coke base material may be replaced with calcined petroleum coke.

The large forming equipment for this process consists of a 600 ton hydraulic press with its associated pumps and controls, a 500 kva. transformer with its controls, and 17 inch and 40 inch diameter molds. The small forming equipment consists of a 7.7 ton air operated press and controls, a 15 kva. transformer with its controls and 4 inch diameter molds.

The small press provides an upper usable limit of 1200 p.s.i. on the mix in the nominal 4 inch diameter mold. The large press limitations provide an upper limit of 950 p.s.i. on the mix in the 40 inch mold. As a matter of usual practice, 900 p.s.i. pressure is used on the blend.

The molds used in the process of the invention are cylindrical in shape, with sufficient taper to permit removing the formed piece from the mold. Thermal insulation is applied to the outer surface of the mold to reduce the heat losses from the process. The molds are installed in the press with platens suitable for transferring the press pressure to the mold plungers and to provide the electrical contact thereto.

In the practice of the invention the mold is filled with blend and compressed. Heat is supplied by electrical energy from the transformer. The energy conversion occurs in the blend. Sufficient heat is supplied to convert the binder to a permanently infusible substance.

When pressure is applied, much of the entrapped air is forced out of the blend, and its volume is decreased by about 20 percent. Of course, this varies with the amount of entrapped air which in turn is affected by the blending and mold filling techniques. After this dry compaction, power is applied to the platens. The current passing through the mix produces heat and continues until a temperature of 350° C. is reached.

During the first phase of firing, the length of the mass decreases about 25 percent (ratio of about 1.35:1). At the completion of this phase, gases start to evolve and become continually more copious until the end of the run. The first phase of the process is the period through which the length decreases. This is followed by an increase in length followed in turn by another decrease in length to about the first minimum reached.

During the "dry pressing," air is forced from the mix until the press force is resisted by the mix. This mix resistance is the result of pyramiding the various solid particles in the blend. Some air remains in the voids surrounding these particles, some of which may be quite small. As the temperature increases, some of these particles, the pitch and sulfur, melt and mix. The 175° M.P. pitch does not have a well defined melting point, and one would expect the melting point of a pitch sulfur mixture to be even less well defined. These "liquid phase" ingredients then flow into the voids, displace the air, and permit their place to be taken by "dry material" particles. As the number of continuous particle to particle electrical paths increases, the electrical resistance decreases.

During the next phase, the pitch and sulfur react, and the sulfur takes some of the hydrogen atoms from the pitch hydrocarbons. The sulfur converts to hydrogen sulfide which is forced out as a gas. Some of the carbon or graphite particle paths are physically disrupted, either by the now fluid pitch expanding or by the gas itself, resulting in an increase in electrical resistance.

As the run progresses, the dehydrogenation of the pitch continues, and the pitch volume decreases. Particle to particle contact increases, and the resistance decreases.

The presence of sulfur and its dehydrogenation of the pitch compounds effectively converts the pitch from a thermoplastic material to one that sets or cures at 350° C. or less. Thus the pitch-sulfur mixture becomes a thermosetting binder.

Blends processed include the following, in parts by weight unless otherwise stated.

*Table I*

| Blend | No. 1 | No. 2 | No. 3 | No. 4 | No. 5 |
|---|---|---|---|---|---|
| Graphitized coke 45 flour | 100 | 50 | 50 | 75 | 75 |
| Graphitized coke particles through 1/32" on 1/64" mesh | 0 | 50 | 50 | 25 | 25 |
| Thermatomic Black | 16 | 0 | 8 | 10.7 | 0 |
| 175° C. M.P. Pitch through 35 mesh | varies | varies | varies | varies | varies |
| Sulfur—95% through 325 mesh | (¹) | (¹) | (¹) | (¹) | (¹) |

¹ 20% of the wt. of pitch.

Table II below gives properties for various small press runs. This shows that the baked density is a function of forming pressure, and increases as the forming pressure increases. Less critical applications permit using the lower pressure ranges, but obtaining the best product requires operation at the higher pressure. Further, a point can be reached at which equal incremental increases in pressure produce less and less density increases. A 17 inch trial in which the pressure was reduced during the early stages of the run failed to show any advantage, either in facilitating gas removal or improving properties. Full pressure throughout is as suitable as any pressure variation throughout the run as long as the constant pressure is as great as the maximum pressure in a varied pressure trial.

*Table II*

| Mix | Pitch Level | Sulfur, p.p.h. of Pitch | Pressure | Curing Time (min.) | A.D. |
|---|---|---|---|---|---|
| No. 3 | 26 | 25 | 880 | 48 | 1.73 |
| No. 3 | 24 | 25 | 880 | 40 | 1.74 |
| No. 3 | 26 | 25 | 880 | 44 | 1.78 |
| No. 3 | 28 | 25 | 880 | 35 | 1.74 |
| No. 3 | 22 | 25 | 880 | 28 | 1.72 |
| No. 3 | 28 | 20 | 880 | 42 | 1.76 |
| No. 3 | 29½ | 15 | 880 | 35 | 1.71 |
| No. 1 | 24 | 20 | 880 | 35 | 1.77 |
| No. 1 | 26 | 20 | 880 | 70 | 1.74 |
| No. 1 | 28 | 20 | 880 | 70 | 1.76 |
| No. 1 | 30 | 20 | 880 | 67 | -------- |
| No. 3 | 22 | 25 | 770 | 20 | 1.74 |
| No. 3 | 22 | 25 | 660 | 19 | 1.68 |
| No. 3 | 22 | 25 | 550 | 20 | 1.64 |
| No. 3 | 28 | 25 | 660 | 24 | 1.72 |
| No. 3 | 28 | 25 | 770 | 37 | 1.75 |
| No. 3 | 24 | 25 | 880 | 25 | 1.72 |
| No. 3 | 26 | 25 | 880 | 30 | 1.73 |
| No. 3 | 28 | 25 | 880 | 35 | 1.74 |
| No. 3 | 30 | 25 | 880 | 30 | 1.73 |

As an example of the effectiveness of the process of the invention for making large carbon or graphite articles, a description of the blends used, the process and the final properties obtained in making 17 and 40 inch diameter articles follows.

Thermoset cylindrical 17 inch diameter articles were formed by the instant process from blend No. 3 using a pitch level of 28 parts. The cured article was made according to the molding-curing method previously described, and then it was heated directly to a graphitizing temperature in a conventional Acheson type electric furnace.

Similarly No. 1 blend containing 32½ parts pitch was used to form 17 inch diameter articles. In this case the cured article was baked to approximately 900° C. in a gas-fired conventional type carbonizing furnace, and then graphitized. Physical properties shown by the articles made from the No. 1 and No. 3 blends as described above are as follows.

Table III

| | Apparent Density | Spec. Res. (Micro-ohm-Cm.) | | Modulus of Rupture | | Permeability (Millidarcys) | |
|---|---|---|---|---|---|---|---|
| | | W | A | W | A | W | A |
| Blend No. 3 | 1.78 | 1,340 | 1,630 | 2,530 | 2,050 | 8-20 | 8-35 |
| Blend No. 1 | 1.81 | 1,530 | 2,070 | 2,640 | 2,020 | 3-6 | 2-4 |

NOTE.—Values shown under W were obtained by measuring test samples cut from the cylinder in a direction parallel to its grain structure, i.e., normal to the direction of molding pressure. Values shown under A represent measurements on samples cut at 90° to the grain structure.

Graphite cylinders 40 inches in diameter, 30 inches high, were also made from blend No. 3 at the same binder-sulfur concentration as were the 17 inch diameter articles. After curing, the articles were rapidly baked to 900° in a conventional gas fired carbonizing furnace while being contained in a metal sagger. To prevent oxidation, the article was embedded in packing coke. The so baked article was subsequently impregnated by vacuum pressure technique with molten pitch, and then graphitized in an Acheson furnace. Physical properties of the graphitized cylinder were found to be as follows:

Table IV

| | Apparent Density | Spec. Res. (Micro-ohm-Cm.) | | Modulus of Rupture | | Permeability (Millidarcys) | |
|---|---|---|---|---|---|---|---|
| | | W | A | W | A | W | A |
| 40″ Diam. Article | 1.86 | 1,150 | 1,350 | 3,790 | 3,090 | 1-4 | 1-9 |

The above values exemplify the extremely high apparent density, the strength and the low permeability obtainable in large graphite articles by incorporating the procedure of this invention as a step in sequence of manufacture. These values will vary within relatively low limits, depending upon minor changes in processing conditions.

What is claimed is:

1. A process for making carbonaceous articles comprising forming an electrically conductive dry mixture containing carbonaceous materials consisting of from 8 to 16 parts by weight of carbon and of 50 to 100 parts by weight of graphite particles, together with from 22 to 35 parts by weight of a liquefiable binder material capable of polymerizing at a temperature below 400° C. and 6 to 25 percent by weight of said binder of finely divided elemental sulfur, placing said mixture in a mold while at a temperature below the liquefying temperature of said binder, subjecting said mixture to a pressure ranging from 500 to 1200 pounds per square inch to compress the same, and decrease the volume thereof by the removal of air entrapped therein, then increasing the temperature of said mixture while maintaining said pressure thereon by passing current therethrough to raise the temperature thereof to a temperature at which said binder material becomes thermoset but not carbonized, shutting off said current when said temperature has been reached, allowing the formed article to cool while in said mold, removing said formed article from said mold when said pressure falls below about 500 pounds per square inch, and baking said formed article to at least a carbonizing temperature.

2. The process of claim 1 wherein the pressure exerted on the mix ranges from 550 to 880 pounds per square inch.

3. A process for making carbonaceous articles comprising forming an electrically conductive dry mixture containing carbonaceous materials selected from the group consisting of carbon and graphite particles, together with from 22 to 35 parts by weight of a liquefiable binder material capable of polymerizing at a temperature below 400° C. and 6 to 25 percent by weight of said binder of finely divided elemental sulfur, placing said mixture in a mold while at a temperature below the liquefying temperature of said binder, subjecting said mixture to a pressure ranging from 500 to 1200 pounds per square inch to compress the same and decrease the volume thereof by the removal of air entrapped therein, then increasing the temperature of said mixture while maintaining said pressure thereon by passing current therethrough to raise the temperature thereof to a temperature at which said binder material becomes thermoset but not carbonized, shutting off said current when said temperature has been reached, allowing the formed article to cool while in said mold, removing said formed article from said mold when said pressure falls below about 500 pounds per square inch, and baking said formed article to at least a carbonizing temperature.

References Cited in the file of this patent

UNITED STATES PATENTS

| | | |
|---|---|---|
| 1,192,062 | Hinckley | July 25, 1916 |
| 1,837,770 | Gilbert | Dec. 22, 1931 |
| 1,941,280 | Shoeld | Dec. 26, 1933 |
| 2,131,021 | Bemis | Sept. 27, 1938 |
| 2,965,931 | Alden et al. | Dec. 27, 1960 |
| 3,001,237 | Balaquer | Sept. 26, 1961 |

FOREIGN PATENTS

| | | |
|---|---|---|
| 794,989 | Great Britain | May 14, 1958 |